(12) United States Patent
Olivier

(10) Patent No.: US 6,693,568 B2
(45) Date of Patent: Feb. 17, 2004

(54) APPARATUS, AND AN ASSOCIATED METHOD, FOR DETECTING DIGITAL DATA USING MLSE DETECTION WITH A DYNAMICALLY-SIZED TRELLIS

(75) Inventor: Jan C. Olivier, Highland Village, TX (US)

(73) Assignee: Nokia Corporation, Espoo (FI)

( * ) Notice: Subject to any disclaimer, the term of this patent is extended or adjusted under 35 U.S.C. 154(b) by 306 days.

(21) Appl. No.: 09/967,391

(22) Filed: Sep. 28, 2001

(65) Prior Publication Data

US 2003/0063681 A1 Apr. 3, 2003

(51) Int. Cl.[7] .................................................. H03M 7/46
(52) U.S. Cl. ........................................... 341/59; 341/51
(58) Field of Search ............................. 341/59, 118, 120, 341/143; 714/794

(56) References Cited

U.S. PATENT DOCUMENTS 6,081,210 A * 6/2000 Nikolic ......................... 341/59

* cited by examiner

Primary Examiner—Brian Young
(74) Attorney, Agent, or Firm—Frederico Fraccaroli

(57) ABSTRACT

Apparatus, and an associated method, for facilitating recovery of digital data communicated to a receiving station upon a non-ideal channel. Sequences of the data are applied to a reliability indicia generator having a trellis of low-complexity. The reliability indicia generator generates reliability information which is provided to a soft trellis decoder. The soft trellis decoder includes a dynamically-formed trellis of trellis sizes dependent upon the reliability information provided by thereliability indicia generator. When the reliability indicia generator indicates certain nodes of the trellis used to perform MLSE operations to be reliable, such nodes are removed out of the trellis. The MLSE operations performed at the soft trellis are thereby of reduced complexity levels.

20 Claims, 4 Drawing Sheets

APPARATUS, AND AN ASSOCIATED METHOD, FOR DETECTING DIGITAL DATA USING MLSE DETECTION WITH A DYNAMICALLY-SIZED TRELLIS

The present invention relates generally to a manner by which to facilitate recovery of digital data communicated to a receiver upon a communication channel susceptible to distortion. More particularly, the present invention relates to apparatus, and an associated method, by which to perform MLSE (maximum likelihood sequence estimation) upon digital data received at the receiver. Received data is first applied to a reliability indicia generator that operates at a low complexity via channel impulse response length reduction. Reliability information is so-derived at the reliability indicia generator with respect to possible values of the transmitted data. The reliability information is then used at a soft trellis decoder to reduce the matrix size of the trellis by removing out of the trellis nodes indicated by the reliability information unlikely to correspond to values of the transmitted digital data actually sent upon the communication channel.

BACKGROUND OF THE INVENTION

A communication system provides for the communication of data between a sending station and a receiving station. The sending and receiving stations are interconnected by a communication channel. Data to be communicated by the sending station to the receiving station is converted, if necessary, into a form to permit its communication upon the communication channel.

The receiving station is positioned, or is otherwise operable, to detect the data transmitted upon the communication channel to the receiving station. The receiving station acts upon, if necessary, the received data to recreate the informational content of the data. In an ideal communication system, the data, when received at the receiving station, is identical to the data when transmitted by the sending station. However, in an actual communication system, the data is distorted during its communication upon the communication channel. Such distortion distorts values of the data when received at the receiving station. If the distortion is significant, the informational content of the data, as transmitted, cannot be recovered.

An exemplary type of communication system is a radio communication system. In a radio communication system, the communication channel interconnecting the sending and receiving stations forms a radio communication channel. A radio communication channel is defined upon a radio link formed upon a portion of the electromagnetic spectrum. In contrast, in a conventional wire line communication system, a physical connection is required to interconnect the sending and receiving stations to permit a wire line communication channel to be defined thereon. Increased communication mobility is inherently provided in a radio communication system, therefore, in contrast to communications in a conventional, wire line communication system.

Communication of data upon a radio communication channel is, however, particularly susceptible to distortion caused by non-ideal propagation characteristics of the radio communication channel. Data communicated upon communication channels defined in other communication systems are also susceptible to such distortion.

Non-ideal propagation characteristics include multi-path propagation of the data. Multi-path propagation of the data upon a radio, or other, communication channel introduces distortion upon the data as the data is communicated to the receiving station by way of a multiple number of paths. The data detected at the receiving station, as a result, is the combination of signal values of data communicated upon a plurality of different communication paths. Intersymbol interference and Rayleigh fading, for instance, causes distortion of the data. If not compensated for, such distortion prevents the accurate recovery of the transmitted data.

Various manners are used to facilitate recovery of the actually-transmitted data, i.e., the informational content thereof, responsive to analysis of the actually-received data, received at the receiving station. For instance, equalization operations performed by functional equalizer devices facilitate recovery of the informational content of the actually-transmitted data responsive to detection at the receiving station of the transmitted data. MLSE (maximum likelihood sequence estimation) techniques are sometimes utilized by equalizers to estimate values of the actually-transmitted data responsive to the detection of the received data.

The digital data that is communicated between the sending and receiving stations, in some communication systems, is selected from a constellation of allowable symbol values. Increases in the number of symbols contained in the symbol constellation permits higher capacities of communication due to the increased possible values of which the digital data may be formed. However, with the increase in the number of allowable symbols, i.e., a higher density constellation set, detection operations performed at a receiving station to recover the informational content of the transmitted data becomes more complex. And, sampling rates at which the received data is sampled also are increasing, further adding to the complexity required of equalizer operations.

Operations required of conventional equalizers to perform equalization operations upon digital data selected from high-density constellation sets and sampled at high data rates are, at present, unfeasible using the processing capacity of existing processing devices used at receiving stations, such as mobile stations operable in a cellular communication system.

Therefore, alternate equalization, and corresponding decoding, schemes are required to be implemented to permit the equalization, and decoding, operations to be performed upon data selected from higher-density constellation sets and sampled at higher sampling rates.

It is in light of this background information related to the communication of digital data that the significant improvements of the present invention have evolved.

SUMMARY OF THE INVENTION

The present invention, accordingly, advantageously provides apparatus, and an associated method, by which to facilitate recovery of digital data communicated to a receiver upon a communication channel susceptible to distortion.

Through operation of an embodiment of the present invention, a manner is provided by which to perform MLSE (maximum likelihood sequence estimation) upon digital data received at the receiver.

Data is first applied to areliability indicia generator. The reliability indicia generator operates at a relatively low level of complexity through the use of a channel-shortening prefilter used in conjunction with an MLSE or other detector. Reliability information is generated with respect to possible values of the data, prior to its communication upon the non-ideal communication channel. Tthe reliability indicia generator is of a relatively low complexity, and the reliability information is produced quickly and without excessive processing requirements. The reliability information is then used at a trellis decoder of full, impulse response length and operable to select most-likely values of a sequence of the digital data. The number of nodes forming the trellis decoder is selected responsive to values of the reliability information. Nodes associated with data values, indicated by the reliability information, to be unlikely to occur are removed out of the trellis. By removing the node, or nodes, out of the trellis, the computational complexity of the sequence estimation as performed by the trellis decoder is reduced. By increasing the number of nodes that are reduced out of the trellis, a corresponding reduction in the computational complexity of the estimation computations is permitted.

In one aspect of the present invention, a manner is provided by which to perform MLSE (maximum likelihood sequence estimation) detection and decoding in which use of a conventional MLSE detection or decoding operation would be prohibitively complex, such as when a high-density constellation symbol set is utilized or a high sampling rate is used to sample received data. Reliability information is derived by a reliability indicia generator for each symbol, or bit, in a sequence of digital data upon which MLSE detection or decoding operations are to be performed. And, then a soft trellis is created. The soft trellis includes dynamically-sized trellis states. The size of the trellis is selectably reduced responsive to the reliability information that is first derived. The reliability information provides indications of whether a state-value is likely to have been the value of the actually-transmitted data that were assembled. A Viterbi algorithm is executed to perform the MLSE detection or decoding of the sequence of data. Because the number of calculations required to be performed pursuant to execution of the Viterbi algorithm to perform the maximum likelihood sequence estimation is reduced, processing complexity is reduced pursuant to operation of an embodiment of the present invention. Trellis-sizing is dynamically selected so that the required processing to perform the estimation operations is dependent upon the reliability information provided by thereliability indicia generator.

In another aspect of the present invention, multi-user detection in a dispersive channel in which a large number of symbols are used in a modulation alphabet is effectuable at a mobile station operable in a cellular, or other, radio communication system. The amount of turbo or iterative equalization and decoding complexity is significantly reduced, relative to conventional requirements, permitting such operations to be performed at a conventional DSP (digital signal processor) at complexity levels comparable to the use of conventional techniques utilized to estimate data values available in a communication system which utilizes a conventional-density constellation set.

In these and other aspects, therefore, apparatus, and an associated method, is provided for a receiver operable in a communication system to receive transmitted digital data. The transmitted digital data is transmitted to the receiver upon a channel susceptible to distortion. The transmitted digital data is of values at least representative of values of sending-station digital data. The values of the sending-station digital values are recovered responsive to detection at the receiver of the transmitted digital data. A reliability indicia generator is coupled to receive a sequence of the transmitted digital data. The reliability indicia generator forms reliability indicia associated with possible values of a corresponding sequence of the sending-station digital data. A trellis detector is coupled to the reliability indicia generator to receive indications of the reliability indications formed by thereliability indicia generator. The trellis detector is also coupled to receive the indications of the transmitted digital data. The trellis detector trellis decodes the sequence of the transmitted digital data to detect the values thereof. The trellis detector is of a node-size reduced by at least one trellis node responsive to values of the indications of the reliability indicia.

A more complete appreciation of the present invention and the scope thereof can be obtained from the accompanying drawings which are briefly summarized below, the following detailed description of the presently-preferred embodiments of the invention, and the appended claims.

DETAILED DESCRIPTION

Figure 1:
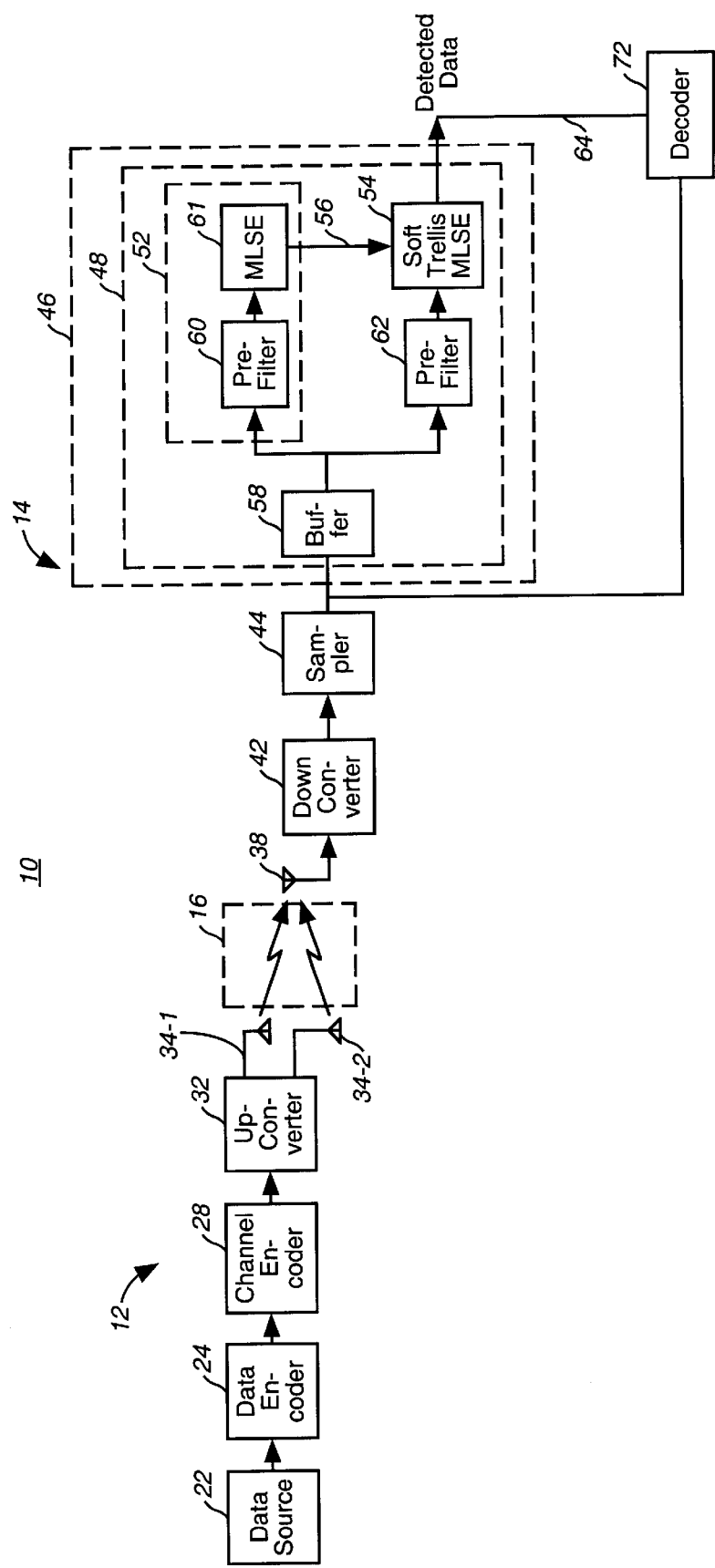
FIG. 1 illustrates a functional block diagram of a communication system in which an embodiment of present invention is operable.

Turning first to FIG. 1, communication system, shown generally at 10 is operable to communicate data between communication stations. In the exemplary implementation, the communication system forms a radio communication system, such as a cellular communication system which provides for eight PSK (phase shift keying) EDGE (enhanced data for GSM evolution) data communications. The communication system is also representative of other types of communication systems including other types of cellular communication systems pursuant to different communication standards. Operation of an embodiment of the present invention can analogously be described with respect to its implementation in such other types of communication systems.

The communications system includes a sending station 12 and a receiving station 14 connected by way of a communication channel defined upon a radio link 16. In the exemplary implementation, the sending station 12 forms the transmit part of a transceiver, here a fixed-site base station, and the receiving station 14 forms the receive part of a transceiver, here a mobile station. Operation of an embodiment of the present invention shall be described with respect to forward-link communication by the sending station 12 of a fixed-site transceiver to the receiving station positioned at a mobile station. In a two-way communication system, reverse-link communications by a mobile station to a fixed-site base station can also be described.

Here, data to be communicated by a sending station upon a radio link to the receiving station is sourced at a data source 22. The data is then encoded by a data encoder 24 according to a desired encoding technique. Data encoding is performed by a data encoder, here to assign to each data bit, or group of data bits, a symbol selected from an 8-PSK constilation symbol set. Data encoded by the encoders provided to a channel encoder 28 that is operable to channel-encode the data provided thereto. The encoded data is up-converted to a radio frequency by an up-converter 32 and transduced into electromagnetic form, here by a set of antenna transducers 34-1 and 34-2.

The data is communicated upon a communication channel defined upon a radio link to the receiving station. The communication channel is a mult-path channel. And the data communicated thereon, by the sending station, is communicated upon paths of differing path lengths. The data communicated upon the separate communication paths arrive at the receiving station, delayed by delay times corresponding to the lengths of the communication paths upon which the data is communicated. Such multi-path transmission results in multi-path fading conditions that interfere with the communication of the informational content of the data actually-transmitted by the sending station. That is, the multi-path fading conditions cause the data received at the receiving station to differ with corresponding values of the actually-transmitted data.

The receiving station is here shown to include an antenna transducer 38 for detecting and transducing into electrical form, the data communicated upon the communication channel formed on the radio link 16. The detected data, herein referred to as the transmitted data, once converted into electrical form is down-converted by a down-converter 42 and sampled by a sampler 44 at a selected sampling rate. The transmitted data, once sampled, is provided to an equalizer 46 that includes the apparatus 48 of an embodiment of the present invention.

Namely, the apparatus 48 includes a reliability indicia generator 52 and a soft trellis decoder 54 coupled thereto by way of the lines 56. The apparatus here further includes a buffer 58 at which to buffer the sampled data, thereafter to be selectably applied to the prefilter and the soft trellis decoder. In the exemplary implementation, the reliability indicia generator further includes a prefilter 60 and an MLSE 61. The apparatus also includes a prefilter 62 positioned in-line between the buffer and the soft trellis decoder 54.

The reliability indicia generator 52 performs first-stage operation of an embodiment of the present invention, and the prefilter and soft trellis decoder 62-54 together perform second-stage operation of an embodiment of the present invention.

A first sequence of data buffered at the buffer 58 is provided to the reliability indicia generator 52. First, the prefilter 60 operates as a channel shortening prefilter, here an impulse response filter. The prefilter forms a prefilter output which is provided to the MLSE 61. The prefilter operates to permit the number of taps of the MLSE detector 61 to be reduced, thereby to permit the MLSE to operate at a relatively low level of complexity.

The MLSE 61 generates reliability information on the line 56 which is provided to the soft trellis decoder 54. The same sequence of data is also retrieved from the buffer 58 and filtered at the prefilter 62 of the second-stage pursuant to second-stage operation of the apparatus 48. Here, the filter operates as a full-length, impulse response filter, and the filtered sequence is provided to the soft trellis decoder. Operation of the decoder generates detected data on the line 64.

The receiving station further includes a decoder 72 coupled to the equalizer 56 operable pursuant to a further embodiment of the present invention. The coded output data decoded pursuant of operation of an embodiment of the present invention on the line 64 extending therefrom is also returned to the equalizer 46 by way of a path 66 coupled between the line 64 and the equalizer 46.

Data buffered by the buffer 58 is first provided to the reliability indicia generator 52. The generator 52 is operable to generate reliability indicia and to provide the reliability indicia, here represented on the line to the soft trellis decoder 54. The reliability information is derived upon symbols, or bits, that are to be detected. And, the trellis of the soft trellis decoder is dynamically sized responsive to the reliability information. When there is a heightened level of uncertainty as to the values of the symbols or bits received at the receiving station and buffered at the buffer, the trellis size of the trellis decoder is widened, i.e., of increased node-size to contain increased numbers of nodes. When the reliability information indicates lessened levels of uncertainty, the size of the trellis is reduced and the number of metrics required to be computed to form an MLSE (maximum likelihood sequence estimation) to estimate the actually transmitted values of a sequence of data are reduced. By reducing the size of the trellis, the reduction in computations required to form the estimate permits MLSE detection and decoding without the need to otherwise synthesize a minimum phase prefilter.

Figure 2:
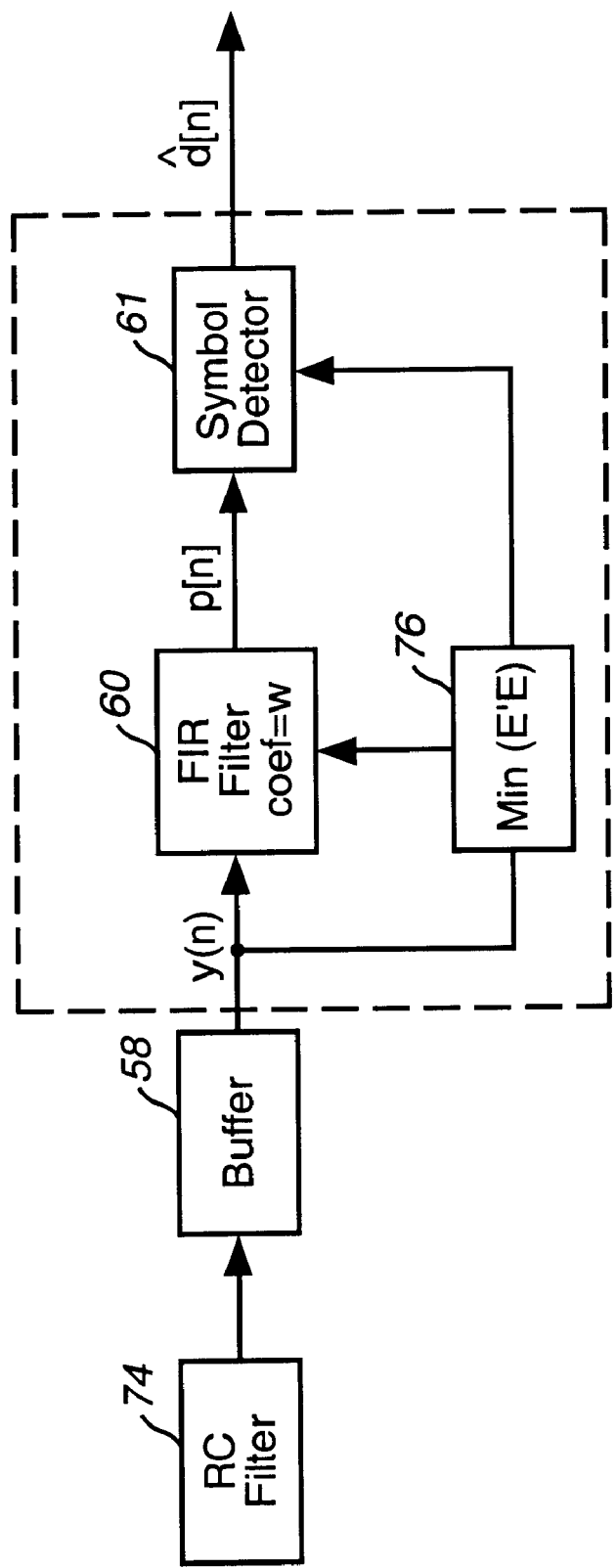
FIG. 2 illustrates a functional block diagram of a portion of the receiving station of the communication system shown in FIG. 2.

FIG. 2 illustrates an implementation of the reliability indicia generator 52 of the reliability indicia generator of the apparatus 48 of an embodiment of the present invention. The prefilter 60 is shown together with the buffer 58 and an RE filter 72. The data is filtered by the resistive-capacitive (RC) filter 74, once sampled, and then buffered at the buffer 58. The reliability indicia generator 52 is here shown to be formed of a FIR (finite impulse response) filter having a coefficient that equals $\Omega$. Buffered data, y[n], are applied to the prefilter 60. Values of p[n] are provided to the MLSE 61, here implemented as a symbol detector. In an implementation in which the sending station utilizes space diversity and transduces the data by a pair of antenna transducers 34-1 and 34-2 (shown in FIG. 1), the filtered received signal, p[n], at the input to the prefilter 60 is represented as:

$$P[n] = \sum_{m=o}^{M} h_1[m]d_i[n-m] + \sum_{m=o}^{M} h_2[m]d_2[n-m] + n_s[n]. \quad \text{Equation 2}$$

wherein h represents the channel response (IR), d represents the transmitted data signals estimated, and n represents the filtered additive noise, and wherein M is the length of the channel.

From this equation where the input sequence is filtered, suitable expressions for the coefficients $\Omega$ are derived. Derivations are made, for instance, utilizing a least square method, of the energy $\epsilon$ is to be minimized, represented by the MIN block 76 so that the following minimization equation is followed:

$$\min \epsilon' \epsilon = \min((\Omega_y - H_1 d_1 - H_2 d_2)'(\Omega_y - H_1 d_1 - H_2 d_2)) \; \omega h_1 h_2$$
$$\omega h_1 h_2 \quad \text{Equation 3}$$

wherein the matrices $\Omega$ and H represent convolution operators of the vectors $\omega$, h. The matrices $\Omega$, H are lower triangular, and the rows contain the vectors in reverse time-order, starting at the diagonal. Direct LS (least square) minimization is performed by casting the minimization requirements in an over-determined matrix form and solving the system by way of pseudo inverse. Use is made of the received and training symbols assumed embedded in the data burst in the determination of the matrices.

As noted above, symbol probability information is derived at the prefilter. Here, a vector $\omega$ with M terms is used. M is the length of impulse response of the system. Short-length $h_i$ are used. An MLSE trellis is applied to detect jointly values $d_1$ and $d_2$. As $h_i$ is forced to be of a short-length, suboptimal low complex detection results are provided by the prefilter. The reliability information forms optimal soft information, and such information is used to select the size of the soft trellis decoder 54.

Figure 3:
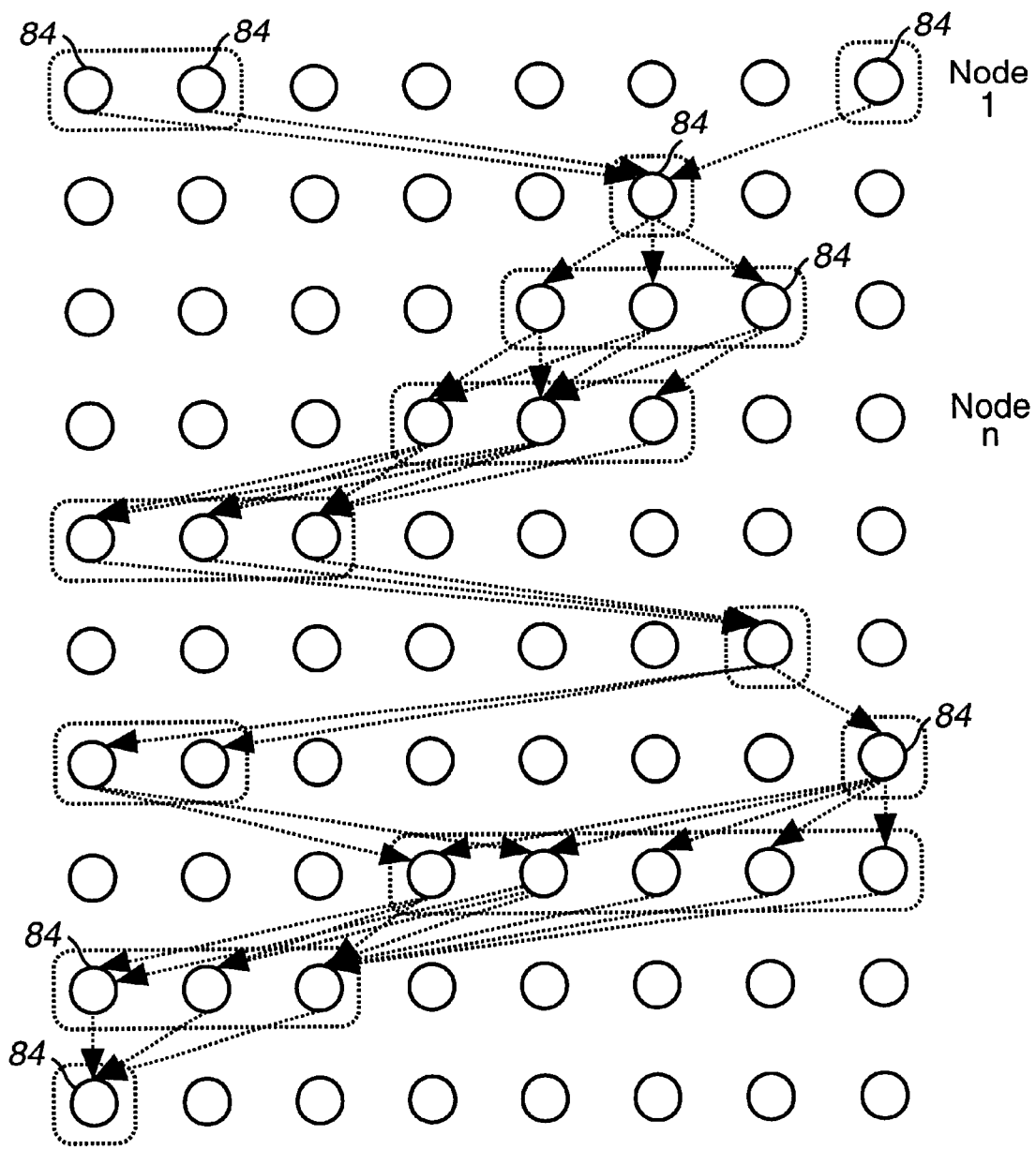
FIG. 3 illustrates a representation of a soft trellis formed during operation of an embodiment of the present invention in which reliability information is utilized to reduce the size of the soft trellis.

FIG. 3 illustrates an exemplary trellis 82 for an 1-transmit implementation, of which inputs to the trellis are represented by one side of the first equation listed above. A plurality of nodes are shown, and each of the circles 84 is representative of a node. Reliability information is provided by the prefilter for each of the nodes. When the reliability information indicates a high probability of occurrence of a node, e.g., greater than a threshold $P_1$ a determination is made that a hard decision at the prefilter is correct, and thus, the trellis, i.e., the number of states, at that point in time is collapsed into a single point. For intermediate probabilities, and increased number of states is used at the trellis at that point in time, and at a low probability, and even greater number of possible states is utilized in the soft trellis at that point in time.

In the exemplary representation of the Figure, the first row includes three nodes 84, the second row includes one node 84, the third row includes three nodes 84, the fourth and fifth rows include three nodes 84, the fifth row includes a single node 84, the sixth row includes three nodes 84, the seventh row includes five nodes 84, the eighth row includes three nodes 84, and the ninth row includes a single node 84. The trellis of reduced size forms a soft trellis. Decisions are not yet made on all symbols, but symbol decisions are made where the reliability indicia generator indicates the satisfactory level of certainty. But, by reducing the number of nodes in the trellis, the computational complexity of forming MLSE is reduced.

Applying the MLSE solution to the exemplary soft trellis 82, survivor and lost paths are selected based upon the computation of a metric, here given by:

$$\|\epsilon\|^2 = \|p - H_1 d_1 - H_2 d_2\|^2 \qquad \text{Equation 4}$$

While an MSLE problem includes a long memory, and many states, the complexity of solving the soft trellis is low and the metric need only be evaluated for the combinations that are examined in the soft trellis, i.e., the above-noted nodes in their respective rows of the trellis. At certain points in time, such as at rows two and six in the trellis 82, the metric computations are much reduced relative to conventional MLSE calculations.

Types of operations are performable at the decoder 72 of the receiving station shown in FIG. 1. Turbo decoding operations are facilitated as, with each iteration, the number of states at which are decisions with certainty are permitted increase. Thus, as iterations of iterative process advances, the decoder becomes less and less complex, facilitating quicker and quicker decoding operations.

Figure 4:
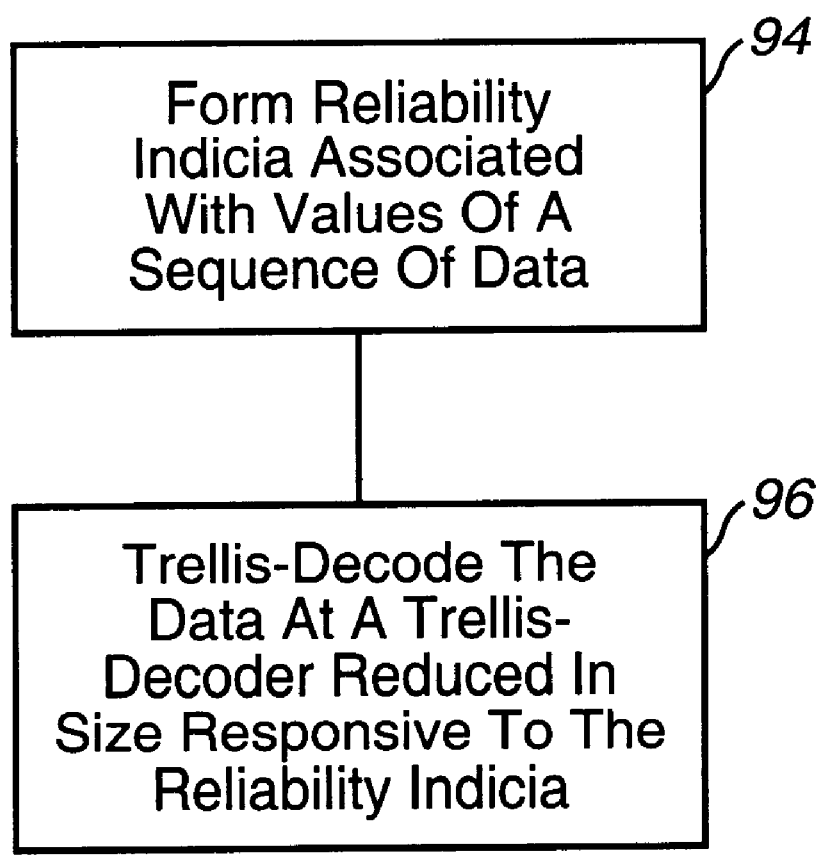
FIG. 4 illustrates a method flow diagram listing the method steps of the method of operation of an embodiment of the present invention.

FIG. 4 illustrates a method, shown generally at 92, of the method of operation of an embodiment of the present invention. The method facilitates recovery of values of sending-station digital values responsive to detection at the receiving station of transmitted digital data. First, and as indicated by the block 94, reliability indicia associated with possible values of a corresponding sequence of the sending-station digital data is formed responsive to a sequence of the transmitted digital data. Thereafter, and as indicated by the block 96, a sequence of the transmitted digital data is trellis-decoded to detect the values thereof at the post prefilter trellis detector. The post-prefilter trellis detector is of a node-size reduced by at least one post-prefilter node responsive to values of the indications of the reliability indicia.

Thereby, recovery of the digital data communicated to a receiver, is facilitated. Reliability is first derived with respect to possible values of data received at the receiver. The reliability information is then used at the trellis decoder to reduce the matrix size thereof, thereby reducing the complexity level of calculations to be performed thereat.

The preferred descriptions are of preferred examples for implementing the invention, and the scope of the invention should not necessarily be limited by this description. The scope of the present invention is defined by the following claims.

What is claimed:

1. In a receiver operable in a communication system to receive transmitted digital data, the transmitted digital data transmitted to the receiver upon a channel susceptible to distortion, the transmitted digital data of values at least representative of values of sending-station digital data, an improvement of apparatus for recovering values of the sending-station digital values responsive to detection at the receiver of the transmitted digital data, said apparatus comprising:

a reliability indicia generator coupled to receive a sequence of the transmitted digital data, said reliability indicia generator for forming reliability indicia associated with possible values of a corresponding sequence of the sending-station digital data;

a trellis detector coupled to said reliability indicia generator to receive indications of the reliability indicia formed by said reliability indicia generator and coupled to receive the indications of the transmitted digital data, said trellis detector defined by a matrix of nodes, said trellis detector for trellis-decoding the sequence of the transmitted digital data to detect the values thereof, said trellis detector of a trellis node-size reduced by at least one trellis node responsive to values of the indications of the reliability indicia.

2. The apparatus of claim 1 wherein the reliability indicia formed by said reliability indicia generator comprises an indication of probabilities of occurrence of various of the possible values of the sequence of the digital data.

3. The apparatus of claim 2 wherein said reliability indicia generator comprises a symbol-probability trellis, the sequence of the transmitted digital data applied to said symbol-probability trellis and the indication of the probabilities of occurrence of the various of the possible values of the sequence of the digital data corresponding to likelihoods of occurrence of paths formed through the symbol-probability trellis.

4. The apparatus of claim 3 wherein the symbol-probability trellis comprises a symbol-probability matrix defined as a matrix of symbol-probability nodes, and wherein the paths formed through the symbol-probability trellis, the likelihood of occurrence of which correspond to the indications of the probabilities of occurrence of the various of the possible values of the sequence of the digital data, extend through the symbol-probability matrix.

5. The apparatus of claim 4 wherein each of the paths extending through the symbol-probability matrix extend through a plurality of the symbol-probability nodes, each of the symbol-probability nodes having associated therewith a likelihood of occurrence responsive to how many of the paths extend therethrough, and wherein the indication of the probabilities of occurrence of the possible values of the sequence of digital data are defined with respect to each of the symbol probability nodes.

6. The apparatus of claim 5 wherein the at least one trellis node by which the node-size of said trellis detector is reduced corresponds to a trellis node exhibiting a lowest probability of occurrence.

7. The apparatus of claim 5 wherein the at least one trellis node by which the node-size of said trellis detector is reduced comprises any of the trellis nodes which exhibit a probability of occurrence less than a selected threshold.

8. The apparatus of claim 6 wherein the at least one trellis node by which the node-size of said trellis detector is reduced comprises any of the trellis nodes which exhibit a probability of occurrence less than fifty percent.

9. The apparatus of claim 1 wherein said reliability indicia generator further comprises a FIR (finite impulse response) filter.

10. The apparatus of claim 1 wherein the sequence of the transmitted data to which said reliability indicia generator is coupled to receive defines a transmitted data vector of a first selected vector length and wherein the reliability indicia is representative of estimated values of the sending-station digital data of a sequence-length corresponding to the first selected vector length.

11. The apparatus of claim 10 wherein the sequence of the transmitted data to which said trellis detector is coupled to receive defines a transmitted data vector of a second selected vector length, the second selected vector length greater than the first selected vector length.

12. The apparatus of claim 1 wherein successive sequences of the digital data are iteratively applied to saidreliability indicia generator, wherein successive values of reliability indicia is formed responsive to application of the successive sequences, and wherein said trellis detector is successively sized responsive to the successive values of the reliability indicia, thereby to dynamically size said trellis detector.

13. The apparatus of claim 1 wherein said reliability indicia generator and said trellis decoder together form an equalizer part of the receiver.

14. The apparatus of claim 1 wherein said reliability indicia generator and said trellis decoder together form a decoder part of the receiver.

15. In a method of communicating in a communication system having a receiver operable to receive transmitted digital data, the transmitted digital data transmitted to the receiver upon a channel susceptible to distortion, the transmitted digital data of values at least representative of values of sending-station digital data, an improvement of a method for recovering values of the sending-station digital values responsive to detection at the receiving station of the transmitted digital data, said method comprising:

forming reliability indicia associated with possible values of a corresponding sequence of the sending-station digital data responsive to a sequence of the transmitted digital data; and thereafter trellis-decoding the sequence of the transmitted digital data to detect the values thereof at a trellis detector, the trellis detector of a node-size reduced by at least one node responsive to values of the indications of the reliability indicia.

16. The method of claim 15 wherein said operation of forming the reliability indicia comprises applying the sequence of the transmitted data to a low-complexity trellis, and wherein the reliability indicia comprises indications of probabilities of occurrence of various of the possible values of the sequence of the transmitted digital data.

17. The method of claim 16 wherein the sequence of the transmitted data applied during said operation of applying is of a first selected vector length and wherein the sequence of the transmitted data decoded during said operation of trellis-decoding of a second selected vector length, the second selected vector length greater than the first selected vector length.

18. The method of claim 16 wherein successive sequences of the digital data are iteratively applied to the low-complexity trellis during said operation of applying and wherein successive values of indications of probabilities of occurrence are formed by the low-complexity trellis.

19. The method of claim 18 wherein the trellis detector at which the sequence of the transmitted data is trellis-decoded during said operation of trellis-decoding is successively sized responsive to the successive values of the indications of the indications of the probabilities of occurrence formed responsive to iterative application to the prefilter trellis.

20. The method of claim 15 wherein said operations of forming and trellis-decoding are performed pursuant to equalizing the sequence of the transmitted digital data.

* * * * *